(12) United States Patent
Bedri et al.

(10) Patent No.: US 12,407,772 B2
(45) Date of Patent: Sep. 2, 2025

(54) SECONDARY DEVICE PRESENCE FOR TRIGGERING PRIMARY DEVICE FUNCTIONALITY

(71) Applicant: APPLE INC., Cupertino, CA (US)

(72) Inventors: Abdelkareem A. Bedri, Pittsburgh, PA (US); Gierad Laput, Pittsburgh, PA (US); Runchang Kang, Redmond, WA (US)

(73) Assignee: APPLE INC., Cupertino, CA (US)

( * ) Notice: Subject to any disclaimer, the term of this patent is extended or adjusted under 35 U.S.C. 154(b) by 379 days.

(21) Appl. No.: 18/115,621

(22) Filed: Feb. 28, 2023

(65) Prior Publication Data

US 2024/0073316 A1    Feb. 29, 2024

Related U.S. Application Data

(60) Provisional application No. 63/374,185, filed on Aug. 31, 2022.

(51) Int. Cl.
*H04M 1/72412* (2021.01)
*G01S 13/04* (2006.01)
*H04M 1/72448* (2021.01)

(52) U.S. Cl.
CPC ......... *H04M 1/72412* (2021.01); *G01S 13/04* (2013.01); *H04M 1/72448* (2021.01)

(58) Field of Classification Search
CPC .. G01S 13/04; G01S 13/765; H04M 1/72412; H04M 1/72448; H04M 1/72454
See application file for complete search history.

(56) References Cited

U.S. PATENT DOCUMENTS

| | | | | |
|---|---|---|---|---|
| 2020/0106877 | A1* | 4/2020 | Ledvina | H04L 63/0869 |
| 2021/0026437 | A1 | 1/2021 | Lingutla et al. | |
| 2021/0219095 | A1 | 7/2021 | Iyer et al. | |
| 2023/0224398 | A1* | 7/2023 | Yang | H04M 1/72454 |
| | | | | 455/569.1 |
| 2024/0323272 | A1* | 9/2024 | Dhing | H04W 4/023 |

FOREIGN PATENT DOCUMENTS

EP    3387847 B1    2/2021

OTHER PUBLICATIONS

International Preliminary Report on Patentability issued in PCT Application No. PCT/US2023/030640, dated Mar. 13, 2025 in 16 pages.
International Search Report and the Written Opinion issued in PCT Application No. PCT/US2023/030640, dated Feb. 8, 2024 in 22 pages.
Invitation to Pay Additional Fees and, Where Applicable, Protest Fee issued in PCT Application No. PCT/US2023/030640, dated Nov. 24, 2023 in 4 pages.

* cited by examiner

*Primary Examiner* — Timothy X Pham
(74) *Attorney, Agent, or Firm* — APPLE INC.

(57) ABSTRACT

Ranging between a primary electronic device and a secondary electronic device can be used to control functional states for the electronic devices. One or more functions of a primary electronic device can be controlled based on the location of a secondary electronic device. The secondary electronic device can be a mobile device or a wearable computer, and the secondary device's location can be a proxy for a user's position. The functions, that are enabled or disabled, can be functions that are related to the user's use and enjoyment of the primary device.

20 Claims, 8 Drawing Sheets

SECONDARY DEVICE PRESENCE FOR TRIGGERING PRIMARY DEVICE FUNCTIONALITY

CROSS-REFERENCES TO RELATED APPLICATIONS

This application claims the benefit to U.S. Provisional Application No. 63/374,185, filed Aug. 31, 2022, entitled "Secondary Device Presence For Triggering Primary Device Functionality," the disclosures which is incorporated by reference in its entirety and for all purposes.

BACKGROUND

Ranging techniques such as time of flight (TOF) or received signal strength indicator (RSSI) can be used to determine the distance between devices or the relative position of the two devices. Such techniques can be used to determine a location of another device. However, it is desirable to identify new and improved uses of ranging techniques, particularly when ranging techniques are prone to uncertainty that can cause operations to perform inconsistently.

BRIEF SUMMARY

Certain embodiments are directed to techniques (e.g., a device, a method, a memory or non-transitory computer readable medium storing code or instructions executable by one or more processors) for controlling operations of one device based on a proximity of another device.

The techniques can include a first ranging measurement between a primary electronic device and a secondary device that is performed to obtain a first ranging value. A proximity state for the primary electronic device can be determined. The proximity state can be that the primary electronic device is in a near state, and the determination can be based on the first range value being with a presence threshold. The near state can indicate that the secondary electronic device is near the primary electronic device. A functional state of the primary electronic device can be turned on based on the secondary device being in the near state, and the functional state may turn off when the secondary device is in a far state. The techniques can include determining an initial value for an absence threshold can be determined. The absence threshold can be used to determine when the proximity state of the secondary electronic device is a far state. A second ranging measurement between the primary electronic device and the secondary electronic device can be performed to obtain a second range value. The second range value can be compared to the absence threshold. Whether the second range value exceeds the absence threshold can be determined based on the comparison to the absence threshold. The second ranging measurement can be performed and compared until the second range value exceeds the absence threshold. The proximity state of the primary electronic device can be updated from the near state to the far state based on the second ranging value exceeding the absence threshold. The functional state of the primary electronic device can be turned off based on the secondary electronic device being in the far state.

Additional implementations may include performing a second ranging measurement between the primary electronic device and the secondary electronic device to obtain a second range value. The second range value can be compared to the presence threshold. Whether the range value exceeds the absence threshold can be determined based on the comparison to the presence threshold. The proximity state can be updated from a far state to the near state based on the comparison to the presence threshold. A change counter can be incremented based on the updating to the near state. Whether to increase a difference between the absence threshold and the presence threshold based on the change counter. The change counter can be decremented after a time period where no state change occurs. The time period can be determined based on the rate of power consumption of the primary electronic device. Whether to increase the difference between the absence threshold and the presence threshold can be based on a comparison of the change counter to a threshold. The difference between the absence threshold and the presence threshold can reach a maximum difference.

These and other embodiments of the disclosure are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
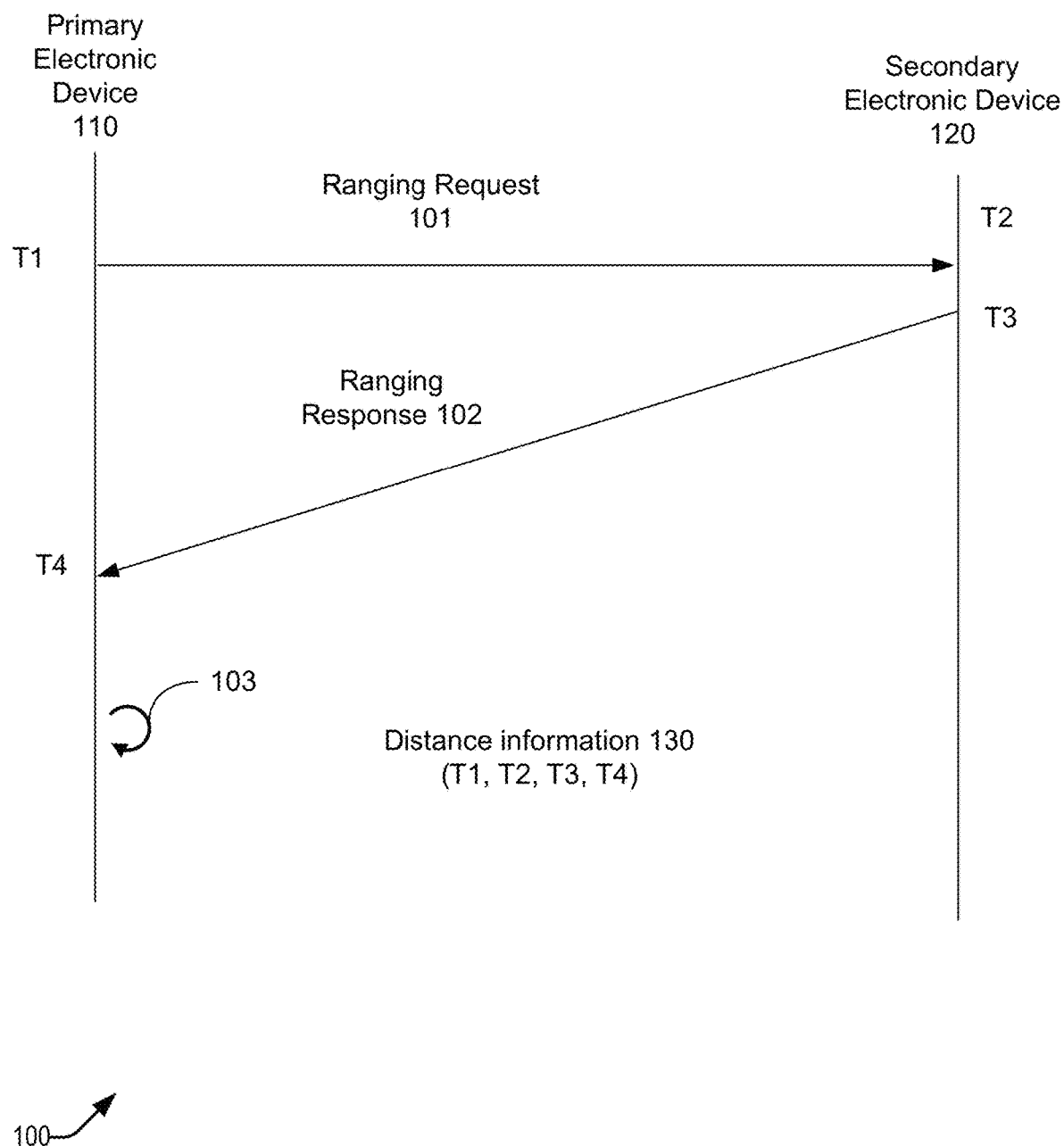
FIG. 1 shows a sequence diagram for performing a ranging measurement between electronic devices according to embodiments of the present disclosure.

Certain embodiments are directed to techniques (e.g., a device, a method, a memory or non-transitory computer readable medium storing code or instructions executable by one or more processors) for controlling operations of one device based on the proximity of another device.

Ranging between electronic devices can be used to control functional states for the electronic devices. One or more functions of a primary electronic device (e.g., a smart phone, a tablet device or a laptop computer) can be enabled, or disabled, based on the location of a secondary electronic device. For instance, a screen on the primary electronic device (e.g., a phone) can be active while the secondary electronic device (e.g., a watch) is within a threshold distance of the primary device. The secondary electronic device can be a mobile device or a wearable computer, and the secondary device's location can be a proxy for a user's position. The functions, that are enabled or disabled, can be functions that are related to the user's use and enjoyment of the primary device. As an example, a video playing on the primary electronic device's screen may pause when the user is further than a threshold distance from the device. Enabling or disabling functions of a primary electronic device can be used to conserve power on the primary electronic device, and, for instance, an electronic device may enter a low power mode if the secondary electronic device is outside of a threshold distance of the primary device. For example, an always on display of the primary electronic device can be turned off when the secondary electronic device is a threshold distance away from the primary device. Turning off the display can conserve the primary electronic device's battery life when the user is away from the device.

Uncertain distance calculations are problematic in boundary areas at the edge of the threshold distance. The uncertainty can be caused by errors in ranging measurements. For instance, the strength of received signals can be absorbed by human bodies or other objects in the environment (e.g., body blocking). This body blocking can cause ranging measurements calculated using received signal strength indicator (RSSI) techniques to vary because the signal strength is reduced because of body blocking and not because of the distance that the signal has traveled. This variance can cause uncertainty in the calculated distance between devices. Uncertainty in time of flight (ToF) ranging techniques can be caused by the ToF signals taking indirect paths between devices which can cause the calculated distance to be longer than the actual distance between devices (e.g., multipath errors). This uncertainty can cause the calculated location to oscillate or "ping-pong" in and out of the threshold distance. Consequently, a primary device function can be triggered inappropriately. For instance, a light on the primary electronic device may flicker on and off even though the person using the secondary electronic device remains near the primary device. Inappropriately triggered events can unnecessarily consume power and shorten the primary electronic device's battery life. The oscillating functions on the primary electronic device can cause a poor user experience. For example, a flickering screen on the primary electronic device can make it difficult for a user to interact with the device.

The oscillations caused by uncertain distance measurements can be mitigated using an adaptive algorithm. Instead of using a single threshold to determine the secondary device's location, the algorithm can select between a presence threshold and an absence threshold based on the user's (e.g., the secondary device's) last state. A presence threshold can determine when the secondary electronic device is in a "near state." An absence threshold can determine when the primary electronic device is in a "near state" because the secondary device's last calculated location was close to the primary device. The primary device's state can change to a "near state" if the secondary device is determined to be outside of the absence threshold.

A threshold can be selected based on the primary device's current state, and ranging measurements (e.g., TOF or RSSI) can be calculated between two electronic devices and compared to the threshold. The comparison can determine if the user has changed locations and whether the primary device's state should be updated. The adaptive algorithm can increase the absence threshold if the location oscillates or "ping-pongs" between states. A change counter can record how many times the user has changed states, and the absence threshold can be increased based on the change counter. For example, in an embodiment using RSSI, the presence threshold can be −75 dBm and the absence threshold can be −80 dBm. The absence threshold can change by −4 dBm each time the counter is incremented. The presence threshold may not change, even with repeated updates to the primary device's state, because the user's experience with the primary device may suffer if an event is not triggered for a present user.

The counter can be incremented each time the primary electronic device's state changes, and changes to the counter can last for a specified time period. The adaptive algorithm can save battery life and the time period can be calibrated based on the amount of power consumed by an event. The time period can be equal to three times the cost of an event so that the adaptive algorithm saves battery life. Continuing the example, the timer can be incremented because the primary device's state changed, and, after a 51 second time period, the counter can be decremented. The adaptive algorithm is dynamic so that the algorithm can adapt to different types of environments. As an example, uncertainty caused by ranging errors, such as RSSI errors caused by body blocking, can be more prevalent in a crowed environment. Ranging errors can fluctuate more in a crowded environment because the signal can be attenuated by people passing between the primary and secondary electronic devices. This attenuation can mean that the secondary electronic device is closer to the primary electronic device than is suggested by the ranging measurements. This ranging uncertainty can result in the primary electronic device falsely determining that the secondary electronic device is in a "far state". Increasing the distance between thresholds can reduce these false "far states," but the increased distance may result in false "near states" in a less cluttered environment. Decrementing the counter can allow the adaptive algorithm to reset so that a threshold adapted to one environment is not applied to a second environment (e.g., so that a threshold for a crowded coffee shop is not applied to the user's living room). The value for the presence threshold may be changed when the counter is decremented. In some embodiments, the absence threshold may only change if the counter value exceeds a counter threshold (e.g., −4 dBm for each counter value above 3).

I. Ranging

In some embodiments, an electronic device can include circuitry for performing ranging measurements. Such circuitry can include one or more dedicated antennas (e.g., 3) and circuitry for processing measured messages (e.g., signals). The ranging measurements can be performed using the time-of-flight of pulses between the two electronic devices. In some implementations, the distance between devices can be measured using the received signal strength indication (RSSI) of a single pulse. In other implementations, a round-trip time (RTT) is used to determine distance information, e.g., for each of the antennas. In other implementations, a single-trip time in one direction can be used. The pulses may be formed using ultra-wideband (UWB) radio technology.

A. Received Signal Strength Indicator (RSSI)

Received signal strength indicator (RSSI) is a measure of the power in a received signal. One or more antennas in an electronics device's array can be configured to measure the received signal strength. The received signal strength can be represented as a negative number with arbitrary units that can vary between implementations. For example, the Institute of Electrical and Electronics Engineers (IEEE) 802.11 technical standard for implementing wireless area network communication and Bluetooth Low Energy (BLE) wireless personal area technology both use decibel-milliwatts (−dBm) as the units for received signal strength, however other units are contemplated.

A signal's strength can be determined with an electronic device's wireless communication antennas. Electronic devices often contain components for wireless communication and RSSI can allow for distance measurements without specialized hardware. To measure RSSI, a primary electronic device can transmit a signal that is received by one or more secondary electronic devices. The signal's power attenuates at a regular rate that can be used to determine a rough distance between the devices.

RSSI ranging techniques can be prone to uncertainty caused by signal attenuation. A signal loses power, or attenuates, as the distance from the signal's source increases. The rate of attenuation can vary based on the signal transmission media with more dense media causing greater attenuation. An example of this phenomenon is body blocking where the human body absorbs a signal's power and causes signal attenuation. A human body between a signal's source and where the signal is received can cause a drop in the signal's RSSI. Body blocking can increase the estimated distance between the primary electronic device and secondary electronic device because the human body attenuates a signal faster than air.

B. Time of Flight (ToF)

FIG. 1 shows a sequence diagram for performing a ranging measurement between electronic devices according to embodiments of the present disclosure. The electronic devices (e.g., primary electronic device and secondary electronic device) can be a smartphone, a smartwatch, a tablet computer, a personal computer, a wearable computer, etc. Although FIG. 1 shows a single measurement, the process can be repeated to perform multiple measurements over a time interval as part of a ranging session, where such measurements can be averaged or otherwise analyzed to provide a single distance value, e.g., for each antenna. FIG. 1 illustrates a message sequence of a single-sided two way ranging protocol. The techniques presented in this application are also applicable to other ranging protocols such as double-sided two way ranging.

Primary electronic device 110 can initiate a ranging measurement (operation) by transmitting a ranging request 101 to a secondary electronic device 120 (e.g., a mobile device, a smartphone, a smartwatch). Ranging request 101 can include a first set of one or more pulses. The ranging measurement can be performed using a ranging wireless protocol (e.g., UWB). The ranging measurement may be triggered in various ways, e.g., based on user input and/or authentication using another wireless protocol, e.g., Bluetooth low energy (BLE). In one example, ranging can start upon receiving certain information in an advertisement signal from a beacon device.

At T1, primary electronic device 110 transmits ranging request 101. At T2, secondary electronic device 120 receives ranging request 101. T2 can be an average received time when multiple pulses are in the first set. Secondary electronic device 120 can be expecting ranging request 101 within a time window based on previous communications, e.g., using another wireless protocol. The ranging wireless protocol and the another wireless protocol can be synchronized so that secondary electronic device 120 can turn on the ranging antenna(s) and associated circuitry for a specified time window, as opposed to leaving them on for an entire ranging session.

In response to receiving the ranging request 101, secondary electronic device 120 can transmit ranging response 102.

As shown, ranging response 102 is transmitted at time T3, e.g., a transmitted time of a pulse or an average transmission time for a set of pulses. T2 and T3 may also be a set of times for respective pulses. Ranging response 102 can include times T2 and T3 so that primary electronic device 110 can compute distance information. As an alternative, a delta between the two times (e.g., T3-T2) can be sent. The delta can be referred to as a reply time.

At T4, primary electronic device 110 can receive ranging response 102. Like the other times, T4 can be a single time value or a set of time values.

At 103, primary electronic device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal T2−T1+T4−T3. More complex calculations can also be used, e.g., when the times correspond to sets of times for sets of pulses and when a frequency correction is implemented.

II. Determining Device Presence

The presence or absence of an electronic device can be used to control a device's functional state. The device's presence can be determined relative to another electronic device using ranging techniques. In some circumstances, the devices presence can be used as a proxy for an individual's location and changes to the device's functionality can be used to conserve power while the individual is not present.

A. Functional State Oscillations

Figure 2:
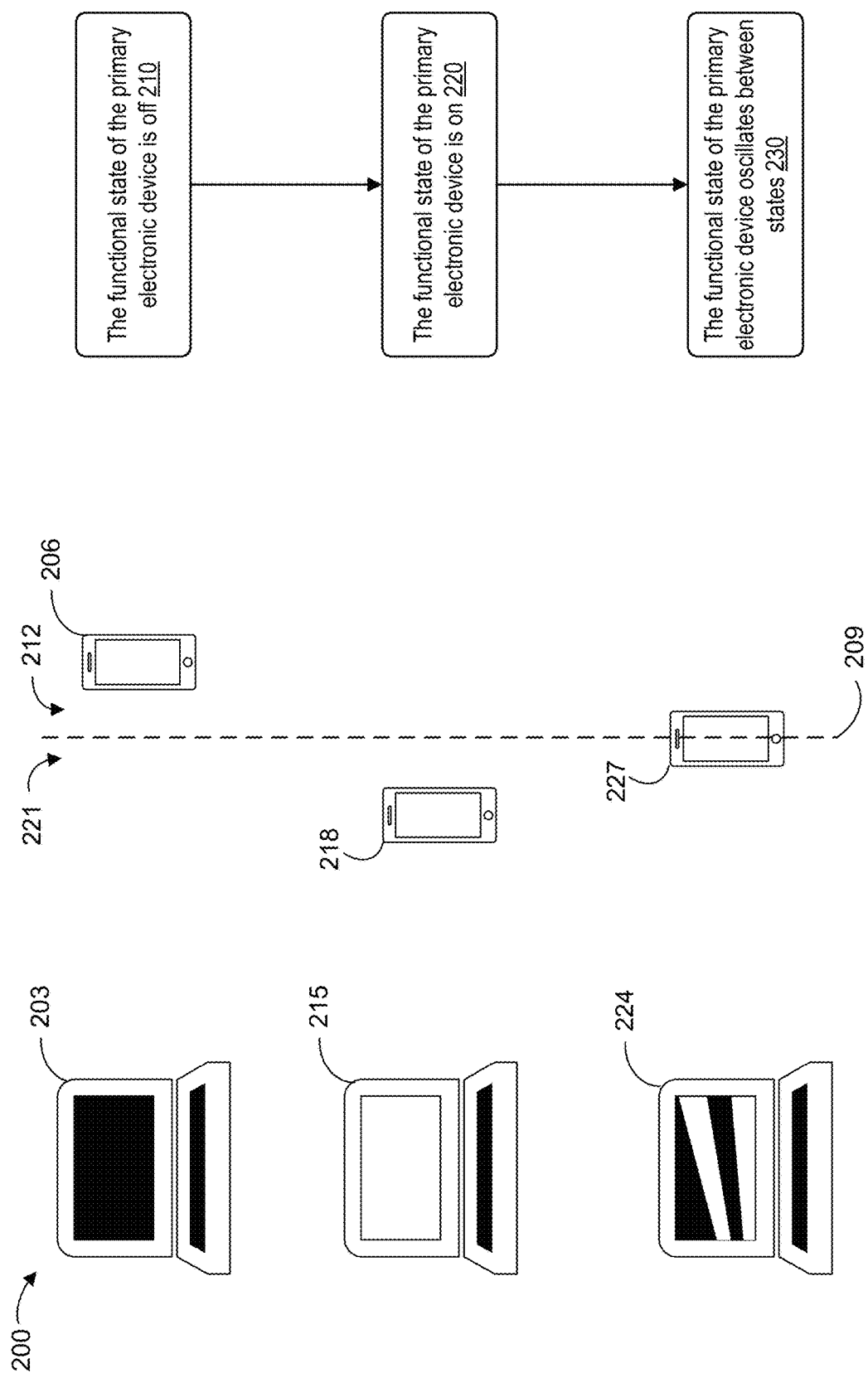
FIG. 2 is a diagram showing changes in device functional states according to embodiments of the present disclosure.

FIG. 2 is a diagram 200 showing changes in device functional states. The functional state of a primary device can change based on a proximity of a secondary device.

At block 210, the functional state of the primary electronic device 203 is off. The functional state in diagram 200 corresponds to the display of the primary electronic device 203 which is shown as black to indicate that the display is off, however other functional states are contemplated.

The functional state of primary electronic device 203 can be based on the proximity state of the secondary electronic device 206. The proximity state for secondary electronic device 206 can be a far state because the device is beyond an absence/presence threshold 209. The proximity state for a secondary electronic device that is in a far area 212 that is further than the absence/presence threshold can be a far state. The absence/presence threshold can be a two-dimensional distance from the primary electronic device 203, a three-dimensional distance from the device, a TOF measurement threshold, or a RSSI measurement threshold. Whether the secondary electronic device is in a near state or a far state can be determined by ranging measurements between the primary electronic device 203 and the secondary electronic device 206.

At block 220, the functional state of the primary electronic device 215 is on. The display of primary electronic device 215 is white to indicate that the device's display is on. The functional state is on because the secondary electronic device 218 is in a near state. The secondary electronic device 218 can be in a near state if the device is in a near area 221 within the absence/presence threshold 209.

At block 230, the functional state of the primary electronic device 224 oscillates between states. The display of primary electronic device 224 is shown as both black and white to indicate that the device is oscillating between device states. There can be uncertainty in the ranging measurements, and the primary electronic device 224 can struggle to determine that the secondary electronic device is in a near or far state if the distance between the secondary electronic device 227 and the absence/presence threshold 209 is less than the uncertainty. In such circumstances, the primary electronic device can oscillate between device states because the ranging measurements provide contradictory messages to the primary electronic device 224.

B. Presence and Absence Threshold

The oscillations between device states can be mitigated by using separate absence and presence thresholds rather than one absence/presence threshold. The difference between the thresholds can be greater than the uncertainty of the ranging measurements so that the primary electronic device can differentiate between the secondary electronic device being in a near state or a far state. The distance between the thresholds can increase dynamically based on the number of state changes during a timeframe.

Figure 3:
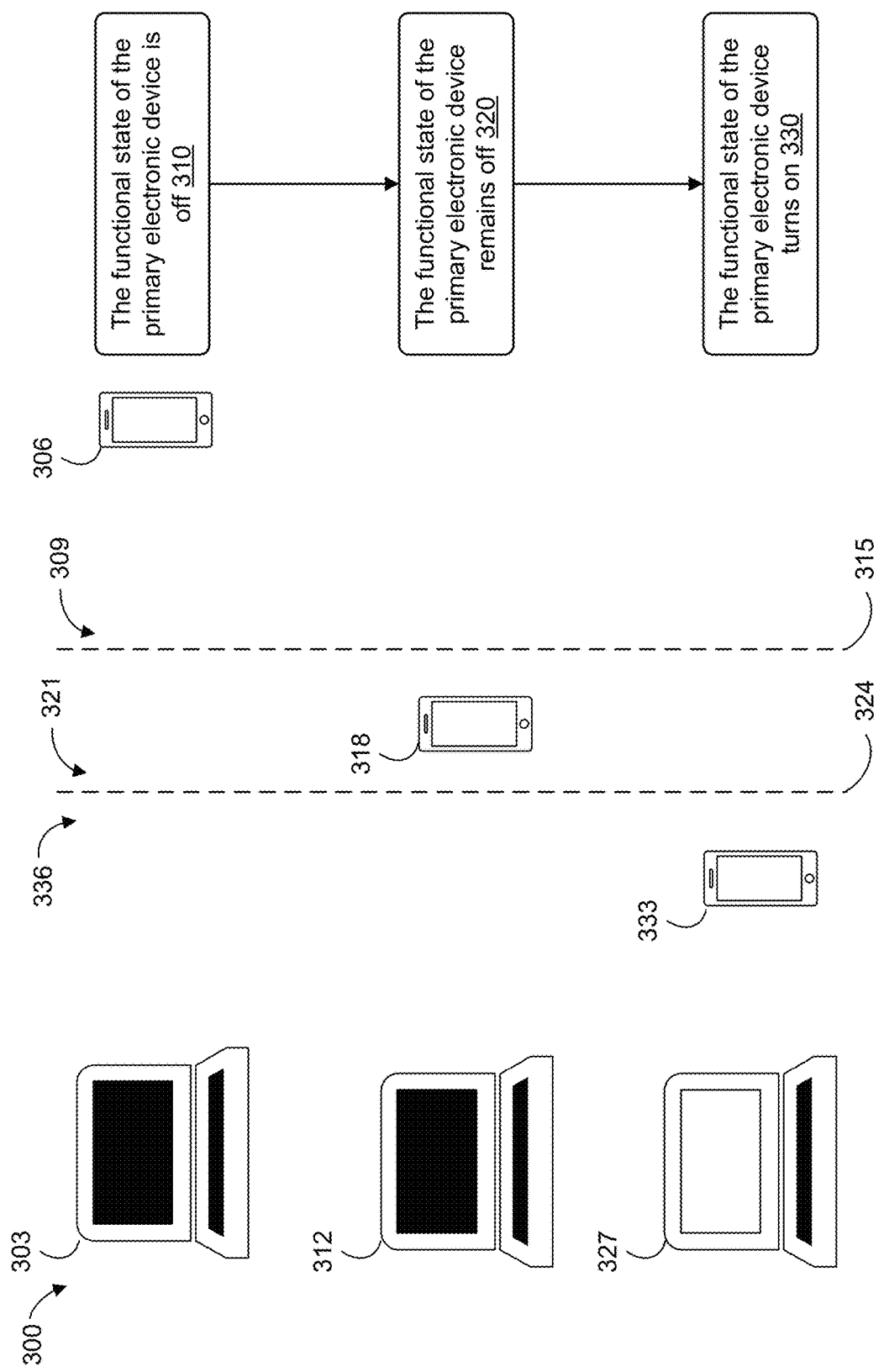
FIG. 3 is a diagram showing the activation of a functional state of a primary electronic device according to embodiments of the present disclosure.

FIG. 3 is a diagram 300 showing the activation of a functional state of a primary electronic device according to embodiments of the present disclosure. The functional state of the primary electronic device can be controlled based on the proximity state of a secondary electronic device that is determined relative to the primary device. The proximity state can be a near state when the secondary device is within a presence threshold and in a far state when the secondary electronic device beyond an absence threshold.

At block 310, the functional state of the primary electronic device 303 is off. The functional state in diagram 300 corresponds to the display of the primary electronic device 303 which is shown as black to indicate that the display is off, however other functional states are contemplated. The functional state of primary electronic device 303 can be off because the secondary electronic device 306 is in a far region 309 beyond the absence threshold 315. Far region 309 corresponds to a far state for proximity.

At block 320, the functional state of the primary electronic device 312 remains off. The secondary electronic device 318 is in an intermediate region 321 within the absence threshold 315 but outside of the presence threshold 324. The state of electronic device 312 may not change when the device enters the intermediate region 321. The size of the intermediate region 321 can change based on how frequently the secondary electronic device 318 changes states. For example, the distance between the presence threshold 324 and the absence threshold 315 may increase if the number of state changes for the secondary electronic device 318 exceeds a threshold. In various embodiments the absence threshold 315 may move further away from the primary electronic device 312, the presence threshold 324 may move closer to the primary electronic device, or both thresholds may move. In some embodiments, the functional state of the primary electronic device 312 may remain on while the secondary electronic device 318 is in an intermediate region 321.

At block 330, the functional state of the primary electronic device 327 turns on. The display of primary electronic device 327 is shown as white to indicate that the functional state is on because the secondary electronic device 333 is in a near region 336 within the presence threshold. The near region 336 can be an area between the primary electronic device 327 and the presence threshold 324 that corresponds to a near state for proximity.

While a presence threshold 324 and an absence threshold 315 are shown, embodiments of the present disclosure can include additional thresholds.

Figure 4:
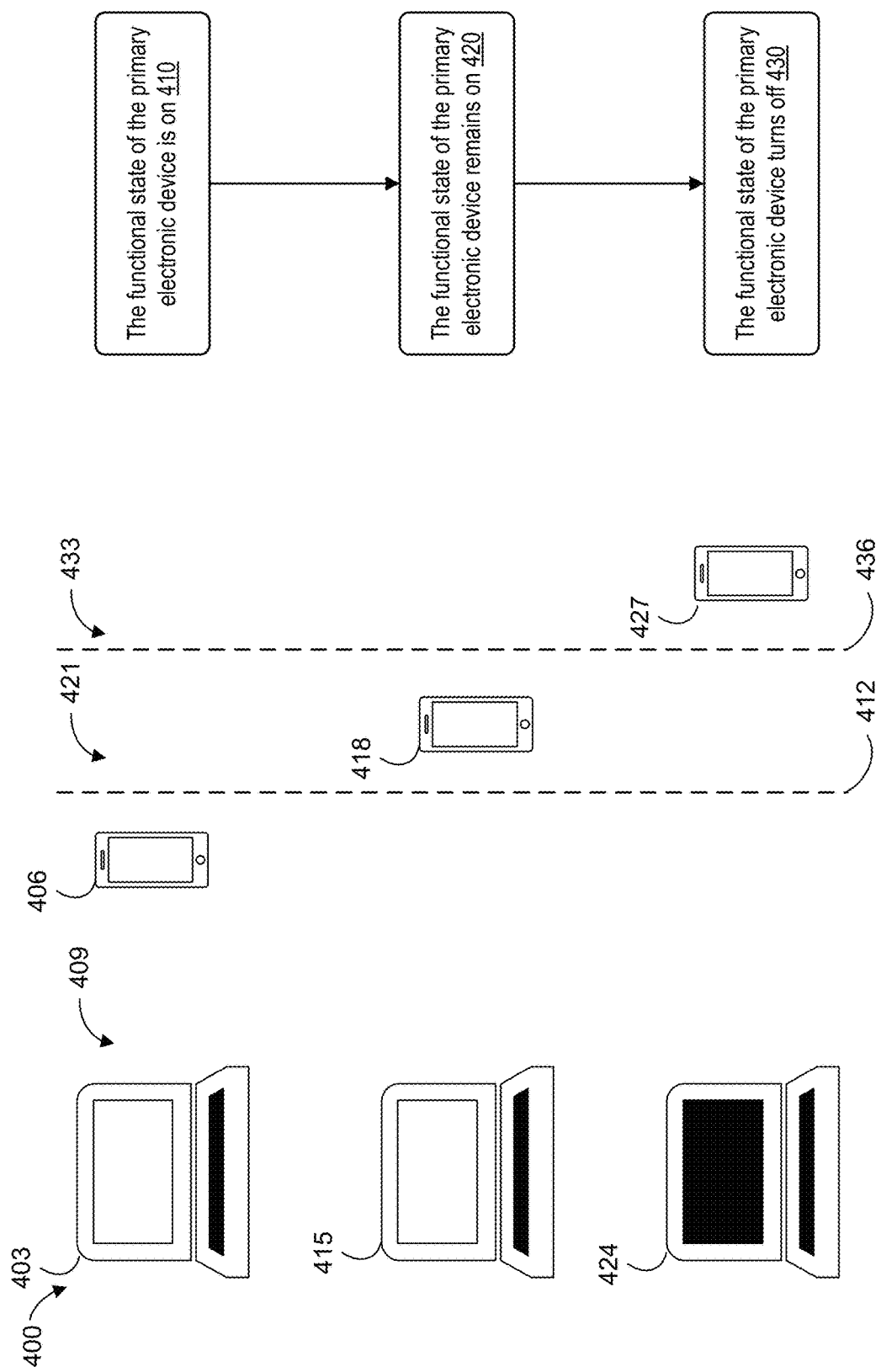
FIG. 4 is a diagram showing the deactivation of a functional state of a primary electronic device according to embodiments of the present disclosure.

FIG. 4 is a diagram 400 showing the deactivation of a functional state of a primary electronic device according to embodiments of the present disclosure. At block 410, the functional state of the primary electronic device is on. The functional state in diagram 400 corresponds to the display of the primary electronic device 403 which is shown as white to indicate that the display is on, however other functional states are contemplated. The functional state is on because the secondary electronic device 406 is in a near region 409 (corresponding to a near state for proximity) between the primary electronic device 403 and the presence threshold 412.

At block 420, the functional state of the primary electronic device 415 remains on. The secondary device state may not change when the secondary electronic device 418 enters the intermediate region 421 between the presence threshold 412 and the absence threshold 436. At block 430, the functional state of the primary electronic device 424 turns off. The secondary electronic device 427 moves from the intermediate region 421 to the far region 433 beyond the absence threshold 436. Far region 433 corresponds to a far state for proximity.

C. Dynamic Threshold

The distance between the absence and presence thresholds can be selected to mitigate false positives. Ranging measurements have uncertainty and the distance between thresholds can be selected so that natural fluctuations in the ranging measurements do not lead the primary electronic device to incorrectly determine that the secondary device has changed states (e.g., false positives). However, the uncertainty for ranging measurements can vary based on the environment, and, for example, RSSI ranging measurements will be more attenuated in a crowded subway station than an empty field. A distance between thresholds that may be appropriate for the open field may lead to false positives in the subway station. Accordingly, dynamic threshold(s) may be able to adapt to the environment and help to mitigate false changes in the secondary electronic device's state.

The dynamic threshold(s) can adapt to new environments by being reset at regular intervals so that threshold(s) adapted to one environment are not applied in less suitable environments. Threshold(s) may reset after a given timeframe where no state change has occurred. The length of the given timeframe can be selected based on the power consumption of the primary electronic device. A functional state change and a dynamic threshold can consume known amounts of power. For instance, a functional state change can consume as much power as implementing a dynamic threshold for 17 seconds. The length of the given timeframe can be selected so that the primary electronic device saves power by implementing a dynamic threshold. For example, the given timeframe can be three times the cost of a functional state change or, in this case, 51 seconds.

The dynamic threshold(s) may reset in response to events. For example, the secondary electronic device can be a wearable computer and the dynamic threshold(s) may reset when the device detects that it is no longer being worn. The wearable computers can include smart watches, smart glasses, smartphones, or computers that are otherwise worn by a person. The wearable computers can use sensor data, such as accelerometer or photoplethysmography (PPG) readings, to determine if the device is being worn. PPG is a technique for measuring blood pulses in tissue that can be used by wearable computers to monitor a users' health data, and a wearable computer may determine that it is not being worn if the device stops receiving PPG data.

The dynamic threshold(s) may reset when input is provided to the primary electronic device. For instance, the dynamic threshold(s) for a smartphone may reset when a user touches the device screen or unlocks the device. In some embodiments, the dynamic threshold(s) may reset when the primary electronic device detects that the device is moving based on accelerometer measurements.

Figure 5:
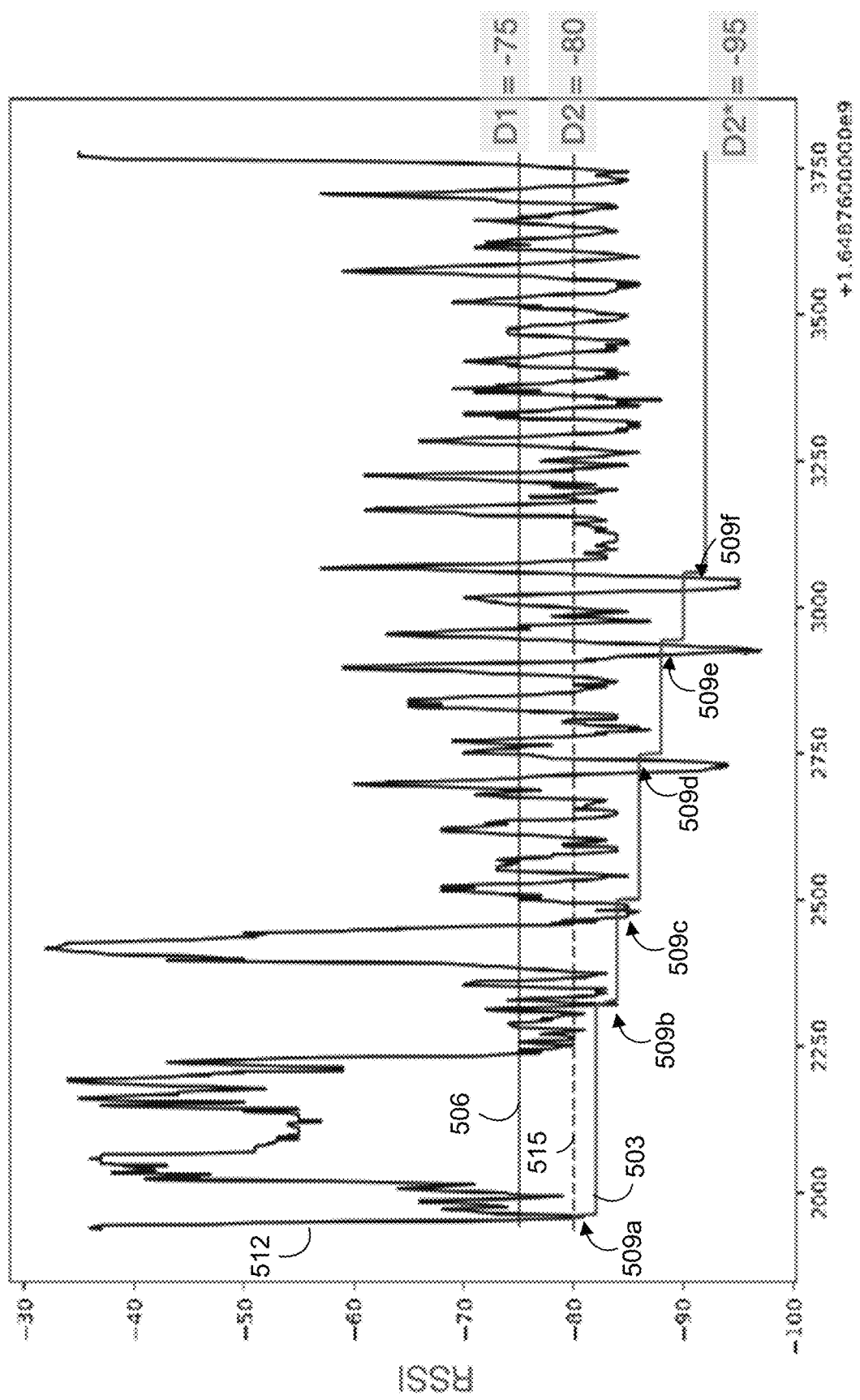
FIG. 5 is a graph showing changes to a dynamic absence threshold in response to received signal strength indicator (RSSI) measurements according to an embodiment.

FIG. 5 is a graph 500 showing changes to a dynamic absence threshold in response to received signal strength indicator (RSSI) measurements according to an embodiment. The x-axis of graph 500 shows RSSI values in −dBm and the y-axis shows time in seconds (s). While a dynamic absence threshold 503 and a static presence threshold 506 is shown, either threshold can be static or dynamic. Static thresholds may be selected when a false negative (e.g., the secondary electronic device changing states without the primary electronic device detecting the change) can impact the user experience. For example, if the functional state corresponds to a display device, a static presence threshold can be used because a user near the primary electronic device would notice that the display was off. Continuing the example, a dynamic absence threshold can be used because a user far from the primary electronic device would not necessarily notice if the display was on or off.

The value of the dynamic absence threshold 503 can change when there is an away event such as away events 509a-509f. An away event can occur when the value of the ranging measurement 512 falls below the dynamic threshold 503, or when the ranging measurement falls below the dynamic threshold 503 and then rises above the threshold within a timeframe (e.g., 1 second). The threshold's value can change by a regular increment (e.g., −4 dBm) for each away event (e.g., away events 509a-509f), or the increment sizes can vary based on the number of away events. For example, the increments could become progressively larger or smaller based on the number of away events 509 in a given timeframe.

The difference between the dynamic absence threshold 503 and the static presence threshold 506 may increase or decrease based on a change counter. The change counter can be incremented for one or more of the away events 509a-509f and the difference can increase after a threshold number of increments. For example, the difference can increase by a regular increment for every away event after the first three away events (e.g., no increase for away events 0-3 and an increase for away events 4-n). The difference between thresholds may decrease after a timeframe without away events. The dynamic absence threshold 503 may return to the initial absence threshold if no away event occurs during a timeframe. The difference between thresholds may decrease by a regular increment for each timeframe without an away event. The regular increment may be the same, more, or less than the regular increment used to increase the difference between thresholds.

Away events can be caused by uncertainty in the ranging measurements between electronic devices. For example, away events 509a-509c can be caused by body blocking attenuating the ranging measurement 512 between a primary electronic device and a smartwatch (e.g., secondary electronic device). Continuing the example, the attenuation could be caused by a person wearing the smartwatch crossing their arms, placing their arm between their legs, or otherwise placing the secondary device in a position where ranging measurements are attenuated. The away events 509d-509f can be actual away events where the person wearing the smartwatch moved away from the primary electronic device. The magnitude of the difference between the ranging measurement 512 and the dynamic threshold can be used to determine if one of the away events 509a-509f is caused by measurement uncertainty or caused by the secondary electronic device moving away from the primary electronic device.

In some instances, movement data from the primary or secondary electronic device can be used to identify away events 509a-509f. For instance, movement data such as pedometer data, global positioning system (GPS) measurements, or inertial measurement units (IMU) from the primary or secondary electronic device can be used to determine if an away event occurred because a person wearing the secondary electronic device moved away from the primary electronic device or if the away event was caused by ranging measurement uncertainty. The dynamic threshold may not be changed if the away event was found to be caused by a user moving away from the primary electronic device because the away event would not be caused by ranging measurement uncertainty. As another example, the dynamic threshold may not be changed if the primary or secondary electronic device movement data indciates that the primary electronic device moved away from the secondary electronic device or that both devices moved away from each other.

In some embodiments, movement data from the primary and secondary electronic devices can be used to control device functionality. For instance, a functional state may be changed if movement data from the two devices indicates that both devices are moving, but the ranging data indicates that the secondary electronic device is in a near state. Continuing the example, the primary and secondary device may use the movement data and ranging measurements to determine that the primary and secondary devices are on an airplane and airplane mode (e.g., the functional state) can be turned on for the primary and secondary devices.

The ranging measurements and sensor data from the electronic devices can be used to train a machine learning model to distinguish between actual away events where a user has moved away from the primary electronic device or away events caused by ranging measurement uncertainty. For example, the machine learning model can be a neural network or decision tree (e.g., boosted tree model) that can be trained to distinguish between user movements and sensor fluctuations.

Returning to graph 500, the dynamic threshold can begin with an initial value that can remain unchanged until an away event 509 occurs. The initial absence threshold 515 is shown as a dashed line at −80 dBm and the dynamic absence threshold 503 shows how the threshold value is adjusted in response to away events 509. In this case approximately −4 dBm is subtracted from the dynamic threshold 503 in response to an away event. There may be limits on how much the dynamic threshold 503 can change and, for instance, the dynamic threshold may not drop below −94 dBm regardless of the number of away events.

While graph 500 shows a dynamic absence threshold 503 that is implemented using RSSI measurements, the threshold can be implemented using other ranging techniques such as time of flight (ToF). The absence and presence thresholds could be time values corresponding to ToF ranging measurements. In some implementations, a detected away event 509 can cause the primary electronic device to switch to a different ranging technique. For instance, the primary electronic device may use RSSI under normal circumstances because RSSI is a relatively low power ranging technique. The primary electronic device may switch to ultrawideband (UWB) ranging if the primary electronic device detects a threshold number away events 509.

III. Ranging to Control a Functional State of an Electronic Device

Figure 6:
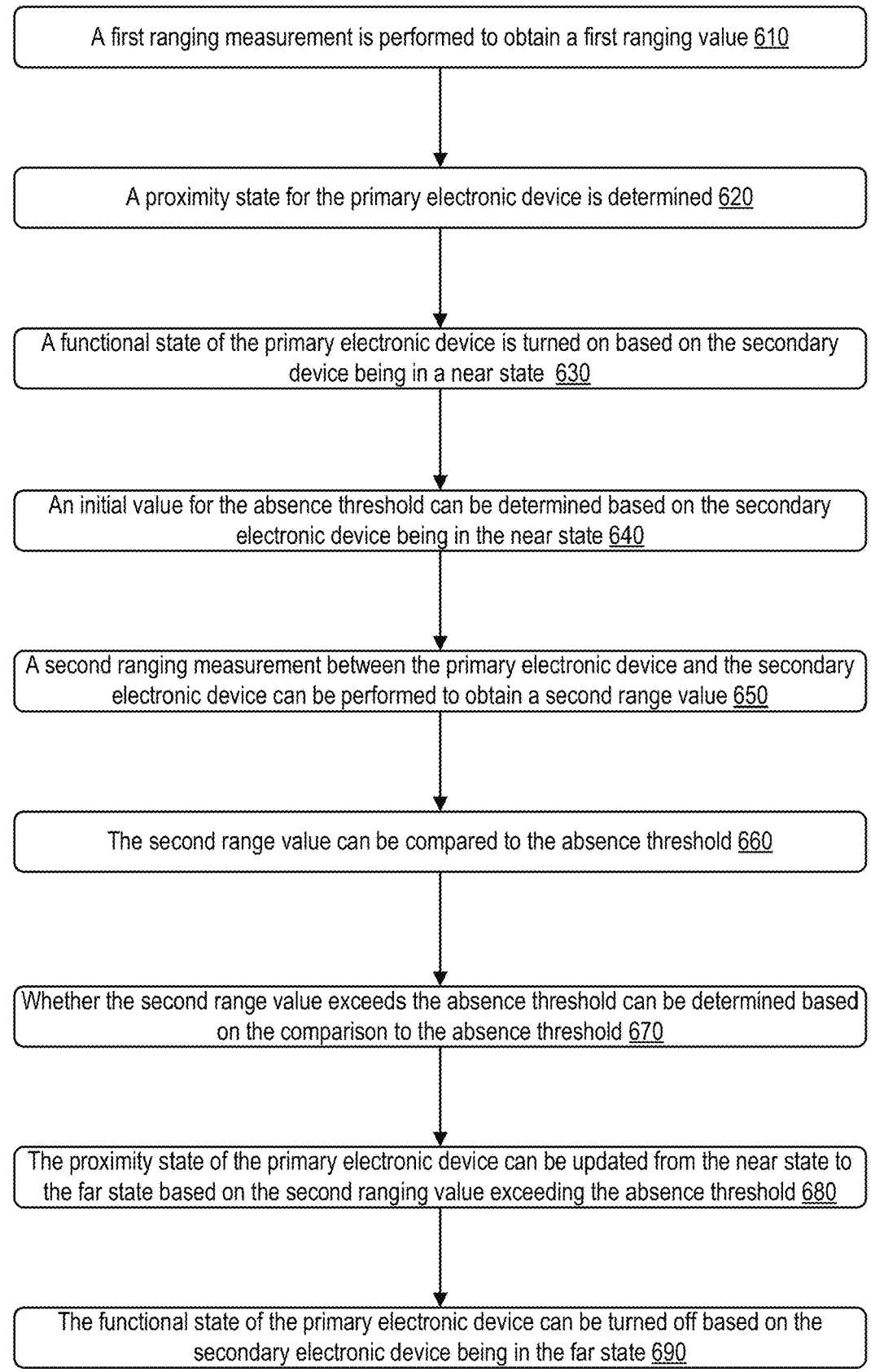
FIG. 6 is a flowchart illustrating a method for performing ranging to control a functional state of an electronic device.

FIG. 6 is a flowchart illustrating a method 600 for performing ranging to control a functional state of an electronic device. In some implementations, one or more method blocks of FIG. 6 may be performed by an electronic device (e.g., primary electronic device 203, 215, 224, 303, 312, 327, 403, 415, 424, secondary electronic device 206, 218, 227, 306, 318, 333, 406, 418, 427, mobile device 700, 800). In some implementations, one or more method blocks of FIG. 6 may be performed by another device or a group of devices separate from or including the mobile device. Additionally, or alternatively, one or more method blocks of FIG. 6 may be performed by one or more components of an electronic device (e.g., primary electronic device 203, 215, 224, 303, 312, 327, 403, 415, 424, secondary electronic device 206, 218, 227, 306, 318, 333, 406, 418, 427, mobile device 700, 800), such as always-on processor (AOP) 730, Bluetooth Controller (BTC) 735, application processor 740, processor 818, computer readable medium 802, input/output (I/O) subsystem 806, ultra-wideband (UWB) circuitry 715, BT/WiFi circuitry 725, wireless circuitry 808, etc.

At block 610, a first ranging measurement between a primary electronic device and a secondary device can be performed to obtain a first ranging value. The ranging measurement can be a one-to-one ranging measurement or a multidevice ranging measurement, for instance, the ranging can be one-to-many or many-to-one ranging. The primary electronic device can be an electronic device such as primary electronic device 110, secondary electronic device 120, mobile device 700, electronic device 800, and the like. The primary electronic device or the secondary electronic device can be a wearable computer.

At block 620, a proximity state for the primary electronic device is determined. The proximity state can be that the primary electronic device is in a near state. The determination can be based on the first range value being with a presence threshold. The near state indicating that the secondary electronic device is near the primary electronic device. The presence threshold, or the absence threshold, can be tunable based on the functional state that is being controlled. The value of a tunable threshold can be adjusted to adapt to different functional states. For instance, the presence threshold may be closer (e.g., −72 dBm) to the primary device for a small (e.g., 1 centimeter (cm) wide) display device and the presence threshold may be further (e.g., −77 dBm) to the primary device for a large display device (e.g., 20 cm wide).

At block 630, a functional state of the primary electronic device is turned on based on the secondary device being in the near state. Turning on the functional state of the primary electronic device can mean turning on one or more display devices, speakers, cameras, locks, etc. on or communicably coupled with the primary electronic device. Turning on the functional state of the primary electronic device can mean causing audio content, video content, or multimedia content to play, or pause.

In some implementations, the functional state may turn off when the secondary device is in a near state. For example, turning off the functional state may mean turning off a security alarm based on a determination that the secondary device is in a near state. In another example, the functional state can be an alert for a proximity based tracker that can alert the primary electronic device if the secondary electronic device is in a far state. Continuing the example, proximity based tracker could be used to alert a user if they have left their belongings at a coffee shop or if their dog, with a smart collar, has run away.

At block 640, an initial value for an absence threshold can be determined. The absence threshold can be used to determine when the proximity state of the secondary electronic device is a far state.

At block 650, a second ranging measurement between the primary electronic device and the secondary electronic device can be performed to obtain a second range value.

At block 660, the second range value can be compared to the absence threshold.

At block 670, whether the second range value exceeds the absence threshold can be determined based on the comparison to the absence threshold. The second ranging measurement can be performed and compared until the second range value exceeds the absence threshold.

At block 680, the proximity state of the primary electronic device can be updated from the near state to the far state based on the second ranging value exceeding the absence threshold.

At block 690, the functional state of the primary electronic device can be turned off based on the secondary electronic device being in the far state.

Method 600 may include additional implementations, such as any single implementation or any combination of implementations described below and/or in connection with one or more other processes described elsewhere herein.

The additional implementations may include performing a second ranging measurement between the primary electronic device and the secondary electronic device to obtain a second range value. The second range value can be compared to the presence threshold.

Whether the range value exceeds the absence threshold can be determined based on the comparison to the presence threshold. The proximity state can be updated from a far state to the near state based on the comparison to the presence threshold. A change counter can be incremented based on the updating to the near state. Whether to increase a difference between the absence threshold and the presence threshold based on the change counter. The change counter can be decremented after a time period where no state change occurs. The time period can be determined based on the rate of power consumption of the primary electronic device. The time period can be 1 second (s), 5 s, 10 s, 15 s, 20 s, 30 s, 40 s, 50 s, 60 s, 70 s, 80 s, 90 s, 2 minutes (min), 3 min, 4 min, 5 min, 6 min, 7 min, 8 min, 9 min, or 10 min. Whether to increase the difference between the absence threshold and the presence threshold can be based on a comparison of the change counter to a threshold. The difference between the absence threshold and the presence threshold can reach a maximum difference. For example, the maximum difference can be −20 dBm, −30 dBm, −40 dBm, −50 dBm, −60 dBm, −70 dBm.

Although FIG. 6 shows example blocks of method 600, in some implementations, method 600 may include additional blocks, fewer blocks, different blocks, or differently arranged blocks than those depicted in FIG. 6. Additionally, or alternatively, two or more of the blocks of method 600 may be performed in parallel.

IV. Mobile Device for Performing Ranging

Figure 7:
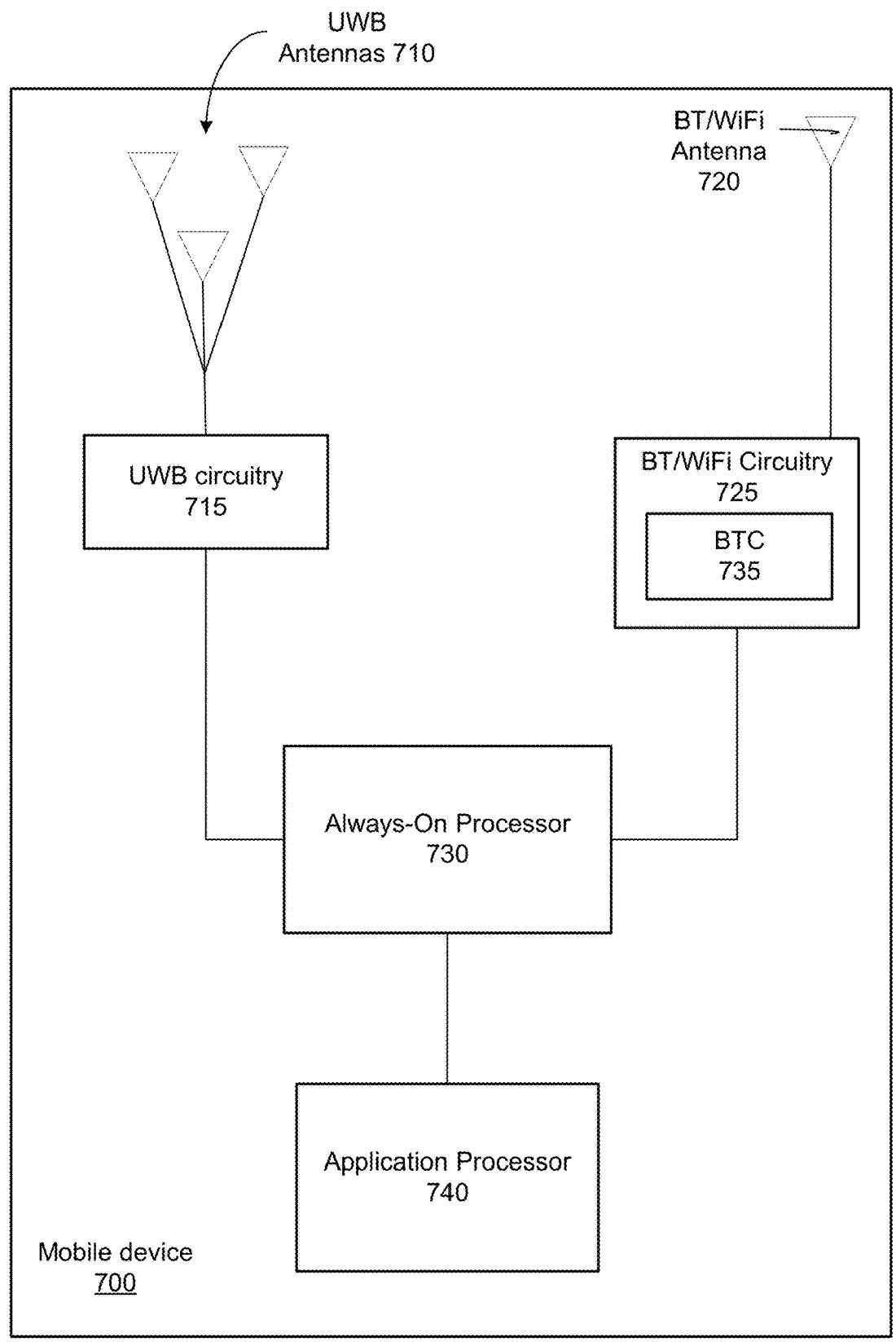
FIG. 7 is a block diagram of components of a mobile device operable to perform ranging according to embodiments of the present disclosure.

FIG. 7 is a block diagram of components of a mobile device 700 operable to perform ranging according to embodiments of the present disclosure. Mobile device 700 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 700 includes UWB antennas 710 for performing ranging. UWB antennas 710 are connected to UWB circuitry 715 for analyzing detected messages from UWB antennas 710. In some embodiments, mobile device 700 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 715 can communicate with an always-on processor (AOP) 730, which can perform further processing using information from UWB messages. For example, AOP 730 can perform the ranging calculations using timing data provided by UWB circuitry 715. AOP 730 and other circuits of the device can include dedicated circuitry and/or configurable circuitry, e.g., via firmware or other software.

As shown, mobile device 700 also includes Bluetooth (BT)/Wi-Fi antenna 720 for communicating data with other devices. BT/Wi-Fi antenna 720 is connected to BT/Wi-Fi circuitry 725, including the Bluetooth Controller (BTC) 735, for analyzing detected messages from BT/Wi-Fi antenna 720. For example, BT/Wi-Fi circuitry 725 can parse messages to obtain data (e.g., an authentication tag), which can be sent on to AOP 730. BTC 735 can be an always on processor that can be used to process data (e.g., an authentication tag) from the BT/Wi-Fi circuitry. In some embodiments, AOP 730 or BTC 735 can perform authentication using an authentication tag. Thus, AOP 730 or BTC 735 can store or retrieve a list of authentication tags for which to compare a received tag against, as part of an authentication process. In some implementations, such functionality could be achieved by BT/Wi-Fi circuitry 725.

In other embodiments, UWB circuitry 715 and BT/Wi-Fi circuitry 725 can alternatively or in addition be connected to application processor 740 or BTC 735, which can perform similar functionality as AOP 730. Application processor 740 typically requires more power than AOP 730, and thus power can be saved by AOP 730 handling certain functionality, so that application processor 740 can remain in a sleep state, e.g., an off state. The BTC 735 or AOP 730 can wake the application processor 740 to perform functionality that requires more processing power. As an example, application processor 740 can be used for communicating audio or video using BT/Wi-Fi, while AOP 730 can coordinate transmission of such content and communication between UWB circuitry 715 and BT/Wi-Fi circuitry 725. For instance, AOP 730 can coordinate timing of UWB messages relative to BT advertisements.

To perform ranging, BT/Wi-Fi circuitry 725 can analyze an advertisement message from another device to determine that the other device wants to perform ranging, e.g., as part of a process for sharing content. BT/Wi-Fi circuitry 725 can communicate this notification to AOP 730, which can schedule UWB circuitry 715 to be ready to detect UWB messages from the other device.

For the device initiating ranging, its AOP can perform the ranging calculations. Further, the AOP can monitor changes in distance between the other devices. For example, AOP 730 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

V. Example Device

Figure 8:
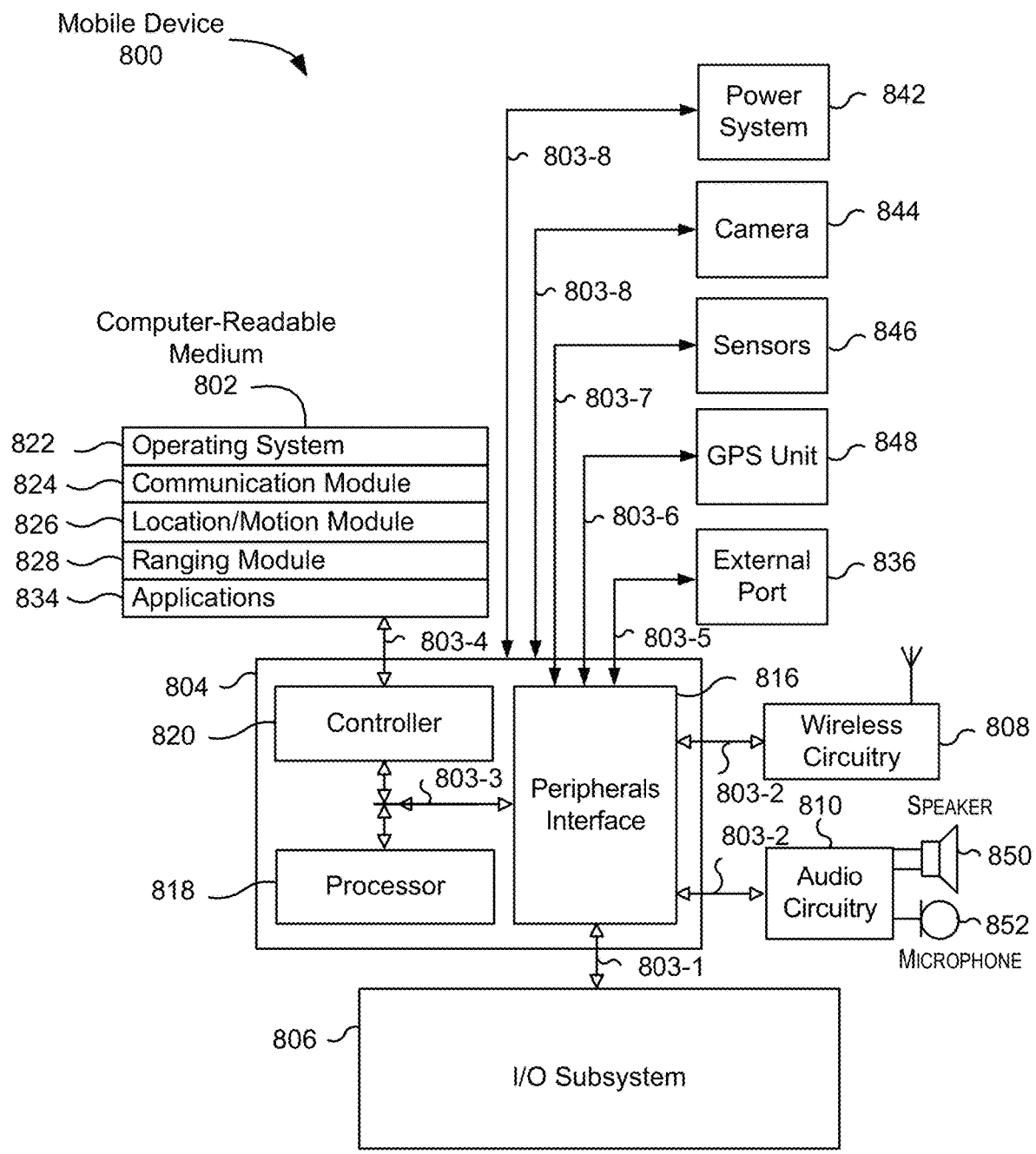
FIG. 8 is a block diagram of an example electronic device according to embodiments of the present disclosure.

FIG. 8 is a block diagram of an example electronic device 800. Device 800 generally includes computer-readable medium 802, a processing system 804, an Input/Output (I/O) subsystem 806, wireless circuitry 808, and audio circuitry 810 including speaker 812 and microphone 814. These components may be coupled by one or more communication buses or signal lines 803. Device 800 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 8 is only one example of an architecture for device 800, and that device 800 can have more or fewer components than shown, or a different configuration of components. The various components shown in FIG. 8 can be implemented in hardware, software, or a combination of both hardware and software, including one or more signal processing and/or application specific integrated circuits.

Wireless circuitry 808 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 808 can use various protocols, e.g., as described herein. In various embodiments, wireless circuitry 808 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 808 is coupled to processing system 804 via peripherals interface 816. Peripherals interface 816 can include conventional components for establishing and maintaining communication between peripherals and processing system 804. Voice and data information received by wireless circuitry 808 (e.g., in speech recognition or voice command applications) is sent to one or more processors 818 via peripherals interface 816. One or more processors 818 are configurable to process various data formats for one or more application programs 834 stored on medium 802.

Peripherals interface 816 couple the input and output peripherals of device 800 to the one or more processors 818 and computer-readable medium 802. One or more processors 818 communicate with computer-readable medium 802 via a controller 820. Computer-readable medium 802 can be any device or medium that can store code and/or data for use by one or more processors 818. Computer-readable medium 802 can include a memory hierarchy, including cache, main memory and secondary memory. The memory hierarchy can be implemented using any combination of random access memory (RAM) (e.g., static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 816, one or more processors 818, and controller 820 can be implemented on a single chip, such as processing system 804. In some other embodiments, they can be implemented on separate chips.

Processor(s) 818 can include hardware and/or software elements that perform one or more processing functions, such as mathematical operations, logical operations, data manipulation operations, data transfer operations, controlling the reception of user input, controlling output of information to users, or the like. Processor(s) 818 can be embodied as one or more hardware processors, microprocessors, microcontrollers, field programmable gate arrays (FPGAs), application-specified integrated circuits (ASICs), or the like.

Device 800 also includes a power system 842 for powering the various hardware components. Power system 842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 800 includes a camera 844. In some embodiments, device 800 includes sensors 846. Sensors can include accelerometers, compass, gyrometer, pressure sensors, audio sensors, light sensors, barometers, and the like. Sensors 846 can be used to sense location aspects, such as auditory or light signatures of a location.

In some embodiments, device 800 can include a GPS receiver, sometimes referred to as a GPS unit 848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 818 run various software components stored in medium 802 to perform various functions for device 800. In some embodiments, the software components include an operating system 822, a communication module 824 (or set of instructions), a location module 826 (or set of instructions), a ranging module 828 that is used as part of ranging operation described herein, and other application programs 834 (or set of instructions).

Operating system 822 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 824 facilitates communication with other devices over one or more external ports 836 or via wireless circuitry 808 and includes various software components for handling data received from wireless circuitry 808 and/or external port 836. External port 836 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 826 can assist in determining the current position (e.g., coordinates or other geographic location identifiers) and motion of device 800. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 826 receives data from GPS unit 848 and analyzes the signals to determine the current position of the mobile device. In some embodiments, location/motion module 826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 808 and is passed to location/motion module 826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 800 based on the position coordinates of the corresponding transmitters. Regardless of the specific location technology used, location/motion module 826 receives information from which a location fix can be derived, interprets that information, and returns location information, such as geographic coordinates, latitude/longitude, or other location fix data.

Ranging module 828 can send/receive ranging messages to/from an antenna, e.g., connected to wireless circuitry 808. The messages can be used for various purposes, e.g., to identify a sending antenna of a device, determine timestamps of messages to determine a distance of mobile device 800 from another device. Ranging module 828 can exist on various processors of the device, e.g., an always-on processor (AOP), a UWB chip, and/or an application processor. For example, parts of ranging module 828 can determine a distance on an AOP, and another part of the ranging module can interact with a sharing module, e.g., to display a position of the other device on a screen in order for a user to select the other device to share a data item. Ranging module 828 can also interact with a reminder module that can provide an alert based on a distance from another mobile device.

The one or more applications 834 on device 800 can include any applications installed on the device 800, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 806 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 806 can include a display and user input devices such as a keyboard, mouse, and/or trackpad. In some embodiments, I/O subsystem 806 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 806 can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a primary electronic device comprising:
    performing a first ranging measurement with a secondary electronic device to obtain a first range value;
    based on the first range value being within a presence threshold, determining that a proximity state for the primary electronic device is a near state indicating that the secondary electronic device is near the primary electronic device;
    turning on a functional state of the primary electronic device based on the secondary electronic device being in the near state;
    selecting an initial value for an absence threshold for determining when the proximity state of the secondary electronic device is a far state;
    until the absence threshold is exceeded:
        performing a second ranging measurement between the primary electronic device and the secondary electronic device to obtain a second range value;
        comparing the second range value to the absence threshold; and
        determining whether the second range value exceeds the absence threshold based on the comparison to the absence threshold;
    updating the proximity state of the primary electronic device from the near state to the far state based on the second range value exceeding the absence threshold; and
    turning off the functional state of the primary electronic device based on the secondary electronic device being in the far state.

2. The method of claim 1, further comprising:
    subsequent to turning off the functional state and until a range value is within the presence threshold:
    performing a third ranging measurement between the primary electronic device and the secondary electronic device to obtain a second range value;
    comparing the second range value to the presence threshold; and
    determining whether the range value exceeds the absence threshold based on the comparison to the presence threshold;
    updating the proximity state from a far state to the near state based on the comparison to the presence threshold;
    incrementing a change counter based on the updating to the near state; and
    determining whether to increase a difference between the absence threshold and the presence threshold based on the change counter.

3. The method of claim 2, wherein determining whether to increase the difference further comprises:
    comparing the change counter to a threshold.

4. The method of claim 2, further comprising:
    increasing the difference a plurality of times after respective increments of the change counter until a maximum difference is reached.

5. The method of claim 2, further comprising:
    decrementing the change counter after a time period in which no state change has occurred.

6. The method of claim 5, wherein the time period is determined based on a rate of power consumption of the primary electronic device.

7. The method of claim 1, wherein the secondary electronic device is a wearable computer.

8. The method of claim 7, wherein a functional state of the primary electronic device is turned on based on the secondary electronic device being worn, where the secondary electronic device is determined to be worn based on an input from a sensor of the secondary electronic device.

9. The method of claim 7, wherein the wearable computer is a smartwatch.

10. The method of claim 1, wherein turning on the functional state of the primary electronic device comprises turning on a display device of the primary electronic device.

11. A computing device, comprising:
    one or more memories; and
    one or more processors in communication with the one or more memories and configured to execute instructions stored in the one or more memories to perform operations comprising:
    performing a first ranging measurement with a secondary electronic device to obtain a first range value;
    based on the first range value being within a presence threshold, determining that a proximity state for the primary electronic device is a near state indicating that the secondary electronic device is near the primary electronic device;

turning on a functional state of the primary electronic device based on the secondary electronic device being in the near state;

selecting an initial value for an absence threshold for determining when the proximity state of the secondary electronic device is a far state;

until the absence threshold is exceeded:
performing a second ranging measurement between the primary electronic device and the secondary electronic device to obtain a second range value;
comparing the second range value to the absence threshold; and
determining whether the second range value exceeds the absence threshold based on the comparison to the absence threshold;

updating the proximity state of the primary electronic device from the near state to the far state based on the second range value exceeding the absence threshold; and turning off the functional state of the primary electronic device based on the secondary electronic device being in the far state.

12. The computing device of claim 11, further comprising:
subsequent to turning off the functional state and until a range value is within the presence threshold:
performing a third ranging measurement between the primary electronic device and the secondary electronic device to obtain a second range value;
comparing the second range value to the presence threshold; and
determining whether the range value exceeds the absence threshold based on the comparison to the presence threshold;
updating the proximity state from a far state to the near state based on the comparison to the presence threshold;
incrementing a change counter based on the updating to the near state; and
determining whether to increase a difference between the absence threshold and the presence threshold based on the change counter.

13. The computing device of claim 12, wherein determining whether to increase the difference further comprises:
comparing the change counter to a threshold.

14. The computing device of claim 12, further comprising:
increasing the difference a plurality of times after respective increments of the change counter until a maximum difference is reached.

15. The computing device of claim 12, further comprising:
decrementing the change counter after a time period in which no state change has occurred.

16. A non-transitory computer-readable medium storing a plurality of instructions that, when executed by one or more processors of a computing device, cause the one or more processors to perform operations comprising:

performing a first ranging measurement with a secondary electronic device to obtain a first range value;

based on the first range value being within a presence threshold, determining that a proximity state for the primary electronic device is a near state indicating that the secondary electronic device is near the primary electronic device;

turning on a functional state of the primary electronic device based on the secondary electronic device being in the near state;

selecting an initial value for an absence threshold for determining when the proximity state of the secondary electronic device is a far state;

until the absence threshold is exceeded:
performing a second ranging measurement between the primary electronic device and the secondary electronic device to obtain a second range value;
comparing the second range value to the absence threshold; and determining whether the second range value exceeds the absence threshold based on the comparison to the absence threshold;

updating the proximity state of the primary electronic device from the near state to the far state based on the second range value exceeding the absence threshold; and turning off the functional state of the primary electronic device based on the secondary electronic device being in the far state.

17. The non-transitory medium of claim 16, further comprising:
subsequent to turning off the functional state and until a range value is within the presence threshold:
performing a third ranging measurement between the primary electronic device and the secondary electronic device to obtain a second range value;
comparing the second range value to the presence threshold; and
determining whether the range value exceeds the absence threshold based on the comparison to the presence threshold;
updating the proximity state from a far state to the near state based on the comparison to the presence threshold;
incrementing a change counter based on the updating to the near state; and
determining whether to increase a difference between the absence threshold and the presence threshold based on the change counter.

18. The non-transitory medium of claim 17, wherein determining whether to increase the difference further comprises:
comparing the change counter to a threshold.

19. The non-transitory medium of claim 17, further comprising:
increasing the difference a plurality of times after respective increments of the change counter until a maximum difference is reached.

20. The non-transitory medium of claim 17, further comprising:
decrementing the change counter after a time period in which no state change has occurred.

* * * * *

UNITED STATES PATENT AND TRADEMARK OFFICE
CERTIFICATE OF CORRECTION

PATENT NO. : 12,407,772 B2
APPLICATION NO. : 18/115621
DATED : September 2, 2025
INVENTOR(S) : Abdelkareem A. Bedri, Gierad Laput and Runchang Kang It is certified that error appears in the above-identified patent and that said Letters Patent is hereby corrected as shown below:

In the Claims

Column 22, Line 16: In Claim 2, replace "range" with --second range--
Column 22, Line 19: In Claim 2, delete "a" replace with --the--
Column 22, Line 22: In Claim 2, replace "range" with --second range--
Column 22, Line 22: In Claim 2, delete "exceeds the absence" replace with --is within the presence--

Column 23, Line 4: In Claim 11, delete "the" replace with --a--

Column 23, Line 30: In Claim 12, replace "range" with --second range--
Column 23, Line 33: In Claim 12, delete "a" replace with --the--
Column 23, Line 36: In Claim 12, delete "exceeds the absence" replace with --is within the presence--

Column 23, Line 61: In Claim 16, delete "computing" replace with --primary electronic--

Column 24, Line 29: In Claim 17, add --computer-readable-- medium
Column 24, Line 31: In Claim 17, replace "range" with --second range--
Column 24, Line 31: In Claim 17, delete "a" replace with --the--
Column 24, Line 37: In Claim 17, add --second-- range
Column 24, Line 37: In Claim 17, delete "exceeds the absence" replace with --is within the presence--

Column 24, Line 48: In Claim 18, add --computer-readable-- medium

Column 24, Line 52: In Claim 19, add --computer-readable-- medium

Column 24, Line 57: In Claim 20, add --computer-readable-- medium

Signed and Sealed this
Twenty-first Day of October, 2025

John A. Squires
*Director of the United States Patent and Trademark Office*